United States Patent [19]

Jeal

[11] Patent Number: 4,778,318
[45] Date of Patent: Oct. 18, 1988

[54] SELF-LOCKING BLIND FASTENER

[75] Inventor: Harvey P. Jeal, Stevenage, England

[73] Assignee: Avdel Limited, Hertfordshire, England

[21] Appl. No.: 47,312

[22] Filed: May 8, 1987

Related U.S. Application Data

[62] Division of Ser. No. 704,207, Feb. 22, 1985, Pat. No. 4,680,823.

[30] Foreign Application Priority Data

Mar. 14, 1984 [GB] United Kingdom ............... 8406710

[51] Int. Cl.$^4$ ............................................ F16B 13/04
[52] U.S. Cl. ...................................... 411/43; 411/55; 411/283
[58] Field of Search .................... 411/40, 41, 43, 55, 411/281–284; 10/86 A

[56] References Cited

U.S. PATENT DOCUMENTS

| 2,286,982 | 6/1942 | Todd | 411/282 |
|---|---|---|---|
| 3,129,630 | 4/1964 | Wing et al. | 411/43 |
| 3,145,751 | 8/1964 | Boots | 411/282 |
| 3,643,544 | 2/1972 | Massa | 411/43 |
| 4,110,858 | 9/1978 | Kerr . | |
| 4,335,479 | 6/1982 | Copithorne . | |
| 4,589,155 | 5/1986 | Jeal | 10/86 A |
| 4,699,552 | 10/1987 | Jeal | 411/43 |

FOREIGN PATENT DOCUMENTS

| 726865 | 3/1955 | United Kingdom . | |
|---|---|---|---|
| 1101669 | 1/1968 | United Kingdom | 411/282 |
| 2113791 | 8/1983 | United Kingdom | 411/43 |

Primary Examiner—Neill R. Wilson
Attorney, Agent, or Firm—Oblon, Fisher, Spivak, McClelland & Maier

[57] ABSTRACT

In a blind fastener (20) of the kind comprising a tubular nut (22) having shank (28) with a head (30) at one end and a tapered nose (32) at the other end, a headed bolt (24) threadedly engaged in the bore (34) of the nut (22), and an expansible sleeve (26) which, by rotating the bolt (24), can be forced on to the nose (32) to form a blind head, a section of the shank (28) of the nut (22) is formed with a single protuberance (42) which protrudes resiliently into the bore (34) sufficiently to interfere with and restrain rotation of the bolt in the nut, and thus render the fastener self-locking. The shank (28) may have more than one section provided with a single such protuberance (42), the effect of several protuberances being additive. Each protuberance (42) lies entirely within a minor sector of its section of the shank, and presents either a flat or a curved threaded surface traversed by the thread (38). Protuberances may be in different sectors if spaced longitudinally of the shank. Each protuberance is formed by impressing a minor zone of the external surface of the thank with a punch (74) while supporting a diametrically opposite zone in a nest (70) shaped so as to substantially preserve the cylindrical shape of the shank in the remaining major sector. A cap (16) is used in cooperation with the nest (70) to define an angled cavity (79) to restrain deformation and axial bending of the shank (28) during the impressing by the punch (74).

5 Claims, 4 Drawing Sheets

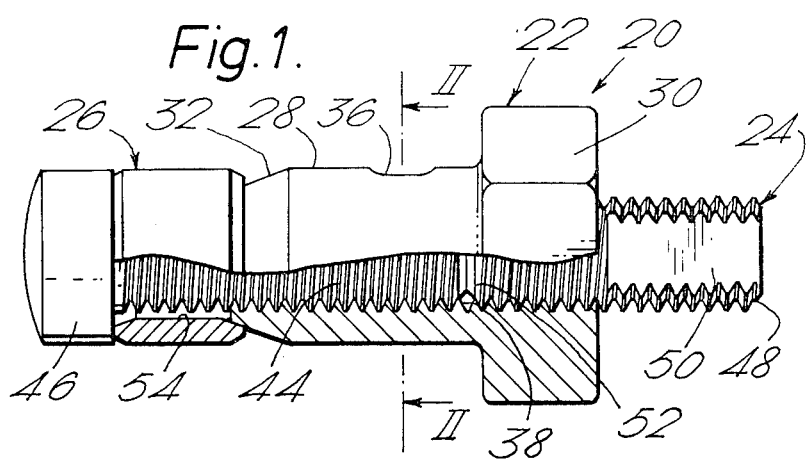
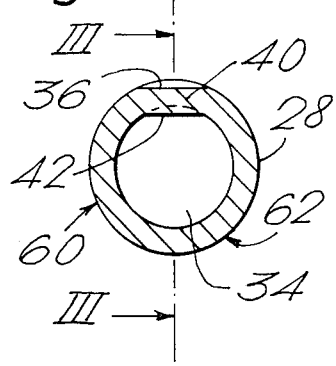
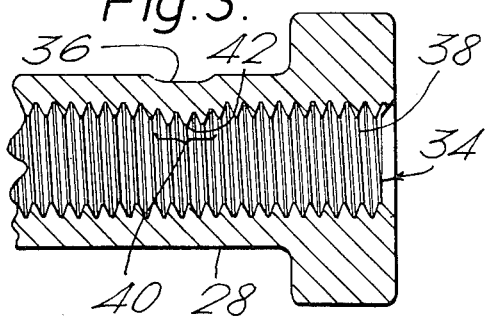
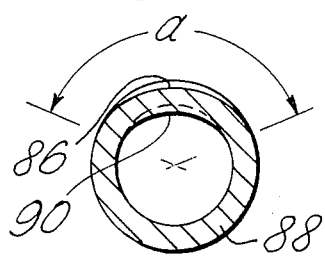
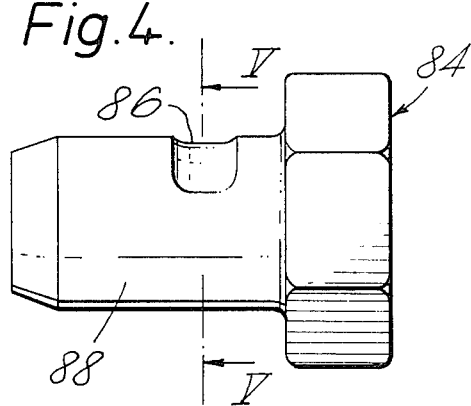

SELF-LOCKING BLIND FASTENER

This is a division of application Ser. No. 704,207, filed Feb. 22, 1985, now U.S. Pat. No. 4,680,823.

This invention relates to a blind fastener of the kind comprising interengageable screw-threaded pieces and in which an interference lock is established when the pieces are screwed together, so as to resist subsequent unscrewing of the pieces when the fastener is in use.

The invention relates particularly, although not exclusively, to a blind fastener of the kind comprising three pieces, namely, a screw-threaded headed bolt, a nut having a female screw thread for mating engagement with the thread of the bolt, and a tubular sleeve, the nut comprising a shank, an enlarged head at one end of the shank, and an axial threaded bore extending through the head and shank, at least a portion of the shank being tapered to a smaller diameter at the end remote from the head of the nut, the sleeve being expandable to form a blind head on setting the fastener by screwing the bolt through the nut so that the bolt head abuts the sleeve and forces it on to the tapered portion of the shank.

Such fasteners are used in the assembly of aircraft, and it is now generally required that they incorporate some form of locking means to resist unscrewing of the nut and bolt when the fastener is in use.

Various forms of interference lock have been proposed to meet this requirement. However, it is important not only that the lock be adequately strong, but also that the manufacture of the fasteners can be controlled so that the lock can be made consistent as between one fastener and another.

We have found a way of producing an interference lock between interengaging screw-threaded pieces which is applicable to fasteners of the kind referred to, and which we believe it is advantageous to employ.

According to one aspect of the present invention, there is provided a blind fastener comprising a bolt and a nut, the bolt having an externally screw-threaded stem and a radially enlarged bolt-head at one end of the stem, the nut comprising a tubular shank having a generally cylindrical bore, the shank being internally threaded around the bore to receive the stem of the bolt in screwthreaded engagement, whereby, on rotating the bolt relative to the nut, the bolt can be caused to move axially along the bore and to cause the formation of a blind head, and wherein but one minor sector of a section of the shank has a radially inwardly depressed zone which provides a single internal, threaded, protuberant zone of the shank which protudes into a region of the cylindrical bore sufficiently to interfere with the movement of the stem of the bolt through the said region, and which is able to yield resiliently to the passage of the bolt when the bolt is forced to pass along the bore in threaded engagement therewith, the protuberant zone extending across a minor sector of the cylindrical bore and longitudinally of the shank through a distance at least equal to the pitch of the thread.

The shank of the nut may have one or more additional inwardly depressed zones each of which provides an additional internal, threaded, protuberant zone as aforesaid, the protuberant zones all being spaced from each other in longitudinally spaced sections of the shank.

Preferably all the protuberant zones are substantially centered on a single straight line extending longitudinally of the shank.

Each internal protuberant zone may present a surface facing into the bore, which surface may be flat or may be curved in either or both the circumferential sense and the longitudinal sense. The blind fastener may be of the kind in which the nut has a radially enlarged preformed head at one end of the shank, and may include a tubular sleeve which can be engaged by the head of the bolt and forced on to the end of the shank of the nut remote from the preformed head by rotation of the bolt relative to the nut, and thereby be expanded to form a blind head.

According to another aspect of the invention, there is provided a method of rendering self-locking a blind fastener of the kind comprising a screw-threaded bolt and a nut having an internally threaded tubular shank surrounding a cylindrical bore for receiving the bolt in threaded engagement with the nut, which method comprises impressing a zone of the external surface of the shank within a minor sector of a section of the shank so as to form a protuberance in a corresponding zone of the threaded internal surface of the shank, which protuberance lies within a minor sector of the bore and protrudes sufficiently to interfere with the passage of the bolt along the bore, and, while impressing the said zone of the external surface, supporting an area of the external surface of the said section of the shank in a sector diametrically opposite the zone in which the depression is being made so as to preserve the shape of the part of the internal cylindrical surface of the shank in the said diametrically opposite sector.

The impression of the shank may be effected by driving a punch against the external surface of the shank.

The punch may be contoured so as to provide the said protuberance with a predetermined shape such as to frictionally engage an inserted bolt over a minor sector of its circumference.

The shank may be supported by a nest having a profile which is complementary to at least that area of the shank which is to be supported while the impression is being made.

The shank may be supported so as to substantially prevent deformation of the shank outside the zone being impressed.

The shank may be supported over a sufficient part of its external surface outside the zone to be impressed as to ensure that the profile of the shank after the impression has been made does not extend beyond the original profile of the shank.

The impression of the surface of the shank may be performed while the bore is vacant. Alternatively, the impression of the surface of the shank may be performed while the bolt is within the bore, provided that the bolt is so disposed as not to support the zone of the shank which will be forced to protrude into the bore.

According to yet another aspect of the invention, there is provided apparatus for rendering self-locking a blind fastener of the kind comprising a screw-threaded bolt, and a nut having an internally threaded tubular shank surrounding a cylindrical bore for receiving the bolt in threaded engagement with the shank, which apparatus comprises a nest for supporting a zone of the external surface of the shank of the nut, and a punch operable to depress a zone within a minor sector of the external surface of a section of the shank of the nut and diametrically opposite the supported zone, so as to form a protuberance within and protruding into the minor sector of the bore.

The nest base may have a channel shaped and dimensioned to receive the shank of the nut so as to support half of the circumference of the shank diametrically opposite the first mentioned zone.

The apparatus may include a nest cap which fits together with the nest base to define a cavity for closely confining the shank a nut to be impinged upon by the punch, the cap having an aperture through which the punch can be driven to impinge on a shank confined within the cavity.

The cavity may be angled so as to bias a shank confined within the cavity to bend along its axis so as to counteract such axial bending may be caused by the action of the punch.

BRIEF DESCRIPTION OF THE DRAWINGS

Embodiments of the invention will now be described, by way of example, with reference to the accompanying diagrammatic drawings, in which:

FIG. 1 is a side elevation, partly in section, of a blind fastener embodying the invention;

FIG. 2 is a cross-sectional elevation on the line II—11 of part of the fastener of FIG. 1;

FIG. 3 is a fragmentary longitudinal sectional elevation on the line III—III of FIG. 2;

FIG. 4 is a side elevation of a part of a blind fastener illustrating an alternative embodiment of the invention;

FIG. 5 is a sectional elevation on the line V—V of FIG. 4;

DETAILED DESCRIPTION OF THE PREFERRED EMBODIMENTS

Figure 4A:
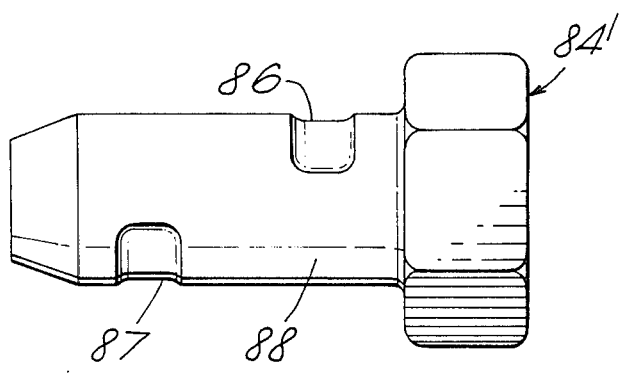
FIG. 4a is a side elevation of a part of a blind fastener illustrating a further alternative embodiment of the invention.

Referring first to FIG. 1 of the drawings, there is shown a blind fastener 20 embodying the invention but otherwise of generally conventional form.

The fastener 20 comprises a nut 22, a bolt 24, and a sleeve 26.

The nut 22 comprises an elongate shank 28 and an enlarged hexagonal head 30 at one end of the shank.

A portion of the shank adjacent the tail-end (that is, the end of the shank remote from the head 30) is tapered to a smaller diameter away from the head to provide a nose 32 of frusto-conical shape. The nut is tubular, having a bore 34 extending axially throughout the head and shank. The external surface of the part of the shank between the nose 32 and the head 30 is cylindrical save for a short section of its length in which a single minor sector of the external circumferential surface of the shank has been deformed, by means of a punch, so as to form a substantially flat, radially inwardly depressed, zone 36, adjacent to, but slightly spaced from, the head 30.

The bore 34 which extends through the head and the shank of the nut is substantially cylindrical, being defined by a circumferential internal surface which is provided by the head and shank and which is formed with an internal screw thread 38. The threaded internal surface of the shank is cylindrical save for a zone 40, shown in FIG. 2, which is located radially inwardly of, and corresponds generally in shape to that of, the depressed zone 36 of the external surface of the shank.

In the zone 40, the screw-threaded internal surface of the shank has a protuberance 42 which protrudes into the otherwise cylindrical bore.

The protuberance 42, and its purpose and operation, will be discussed further after the following description of the other parts of the fastener.

The bolt 24 comprises an elongate stem 44 and a radially enlarged bolt-head 46 at one end of the stem. The stem 44 is threaded for engagement with the screw-thread 38 of the nut, and is longer than the combined lengths of the nut 22 and sleeve 26. The bolt-head 46 is generally cylindrical, and has substantially the same external diameter as that of the shank of the nut. The stem of the bolt has a tail portion 48, remote from the bolt-head 46, which is provided with a pair of diametrically opposed flats 50 to facilitate gripping and rotating of the bolt. The tail portion 48 is connected to the remainder of the stem by a breakneck 52 at which the stem will break when subjected to a predetermined torque.

The sleeve 26 is an expandable tubular cylinder having an external diameter substantially the same as that of the shank 28 of the nut, and has a smooth axial bore 54 in which the stem 44 of the bolt is a clearance fit, and which is flared slightly at both ends so as to facilitate entry of the smaller diameter end of the nose portion 32 of the nut into either end of the bore of the sleeve, so that the sleeve may be assembled on the bolt either way round.

Prior to use, the nut 22, bolt 24 and sleeve 26 are assembled together, the stem of the bolt being inserted through the bore 54 of the sleeve, and then screwed into the tail end of the nut until the tail portion projects from the head end of the nut, and the sleeve is held close to the nose of the nut by the bolt-head.

The assembled fastener can then be used in a well-known manner to fasten together apertured members of a workpiece. In use, the fastener is inserted into aligned apertures in the members of the workpiece so that the shank extends through the members with the head abutting one face of the workpiece, and the bolt-head, sleeve and part of the shank project beyond the opposite, or "blind", face of the workpiece.

The fastener is then set by gripping and rotating the projecting tail portion of the bolt relative to the nut so that the bolt-head is caused to move axially towards the nut. This forces the sleeve over the nose of the nut, causing the sleeve to become radially expanded to form a blind head which moves towards the head 30 until it clamps the members of the workpiece tightly against the head 20. At this stage the torque required to turn the bolt further rises abruptly, and continued rotating therefore results in the bolt breaking at the breakneck 52, allowing the tail portion 48 to be discarded. It is important that the breakneck be able to withstand sufficient torque to permit adequate clamping together of the members of the workpiece before it breaks, but the amount of the torque which it is able to transmit must also be limited in order that it should not permit overtightening of the fastener such as might cause damage to the workpiece.

The protuberance 42 provides an interference lock between the threaded stem of the bolt and the internally threaded nut, the purpose of the lock being to resist any tendency for the bolt to become unscrewed from the nut when the fastener is in use. However, the interference lock thus provided also operates to increase the torque required to screw the bolt stem through the nut during setting of the fastener, and it will be appreciated that if the torque thus required approaches too closely to that which will also break the breakneck, there will be a risk of the bolt breaking prematurely and failing the clamp the members of the workpiece adequately. It is therefore important to be able to produce a controlled interference between the nut and bolt which is tolerant of manufacturing variations so that a suitable differential between the torque required to turn the bolt in the nut and the torque required break the breakneck can be achieved and be repeated consistently as between one fastener and another.

In fasteners of the invention, this is achieved by controlling, during manufacture, and in order of importance, primarily the radial extent to which the protuberance 42 protrudes into the bore 34, secondarily the circumferential extent of the zone of protuberance which interferes with the bolt, and thirdly the axial extent of the protuberance 42, which in general terms means the number of turns of thread which traverse the protuberance.

If there is more than one such protuberance, the interference is also influenced by the number and disposition relative to each other of the several protuberances, and the extent to which each interferes with the bolt has to be controlled. If the several protuberances are so disposed as not to significantly influence each other, their effects, in interfering with the bolt, are additive.

In the embodiment of FIGS. 1 to 3, the nut has only the one protuberance 42.

In contrast to the internal surface of the shank outside the zone 40, the protuberance 42 presents a substantially flat (but threaded) surface which extends as a chord across a minor sector of the circumference of the bore and, in the direction longitudinally of the shank, through a distance slightly greater than twice the pitch of the thread of the nut, so that three turns of the thread traverse the flat surface of the protuberance. In this embodiment, the shank has an external diameter of 6.6 mm, and the diameter of the bore, which is taken as the effective diameter of the internal thread 38, is 4.32 mm. The depressed zone 36 has been depressed 0.36 mm at its maximum depression, and consequently, the protuberance, which corrsponds generally to the depressed zone, protrudes into the bore approximately the same distance, i.e. about 0.36 mm, at its maximum. The bore is therefore reduced from the original 4.32 mm to 3.96 mm on that diameter which passes through the centre of the protuberance, while diameters which do not pass through the protuberance are not materially altered.

As the non-cylindrical deformed section of the shank has only the one protuberant zone occupying but a minor sector of that section of the shank, when the bolt 24 is screwed into the bore 34 and enters the deformed section of the shank, it encounters resistance to its passage from the diametrically opposed regions of the shank, namely the threaded surface of the protuberance 42 and the region of the internal surface of the threaded bore diametrically opposite the centre of the protuberance.

It will appreciated that the protuberance biasses the bolt towards the cylindrically curved region of the bore diametrically opposite to the centre of the protuberance, and consequently the bolt is held in a stable, self-centred position by the forces operating on it. Moreover, in order to enable the bolt to enter the deformed section of the bore of the shank, it is necessary for the shank to yield to the bolt, which it does by bending resiliently to the extent necessary to allow the bolt to pass. However, the necessary bending occurs mainly in two arcuate and opposite portions 60, 62 of the shank (see FIG. 2) which extend from the zone of protuberance to a point diametrically opposite to the centre of the protuberance. Thus, as the bolt enters the deformed section of the shank, it forces the shank to bend so that the protuberance moves radially outwardly from the axis of the shank until the distance between the protuberance and the region diametrically opposite is sufficient to allow entry of the bolt without clearance. In doing this, the two arcuate portions 60, 62 bend resiliently so that their radii of curvature become greater, and the central parts of the arcuate portions tend to move radially inwardly, thus reducing the clearance which existed between them and the bolt. Consequently, the deformed section receives the bolt with reduced clearance, as compared with the rest of the bore, and the two arcuate portions 60, 62 constitute slow-rate springs which tend to urge the protuberance radially inwardly of the bore, so that a compressive force is exerted on the bolt by the protuberance and the region of the shank diametrically opposite the protuberance, pinching the bolt and increasing the resistance to rotation of the bolt.

It will be appreciated that the entry of the bolt into the deformed section of the shank also causes some flexing of the protuberance itself, so that the protuberance assumes a concavely arcuate shape which tends to conform more closely to the circumferential curvature of the bolt, and consequently there is produced an area (rather than a point) of contact between the protuberance and the bolt. Similarly, the region of the shank diametrically opposite the protuberance, being also concavely arcuate, also provides an area, rather than an point, of contact with the bolt. As a result, any wear of the nut and bolt, caused by rotation of the bolt in the nut, is distributed over the areas of contact, and therefore does not lead to an appreciable loss of spring tension in the arcuate portions 60, 62, and so does not materially alter the strength of the lock.

It will also be appreciated that if two protuberances such as the protuberance 42 were provided in a given section of the shank, there would be a risk either of the interference lock between the nut and bolt being easily destroyed under axial loading, or of the lock having a lesser ability to compensate for even minor variations within manufacturing tolerances of the dimensions of the nut and/or bolt.

If more than two protuberances such as the protuberance 42 were provided in any given section of the shank then the number of resilient arcuate portions would be increased, with a corresponding reduction in their lengths, so that their spring-rate would be increased, and consequently the amount of torque required to turn the bolt in the nut would be much more susceptible to variation as a result of slight variations in dimensions within normal manufacturing tolerances.

For this reason, we provide only a single protuberance in any given section of the shank, and we confine the single protuberance to a minor sector so that the greater part of the deformed section of the shank actually remains substantially undeformed from its original part-cylindrical shape. However, it is possible, as will become apparent, not only to form the shank of the nut with more than one section of which each has a protuberance such as the protuberance 42, but also to form the protuberance or protuberances to shapes other than that of the protuberance 42.

In manufacturing fasteners according to the invention, a nut is made in a conventional manner so as to have a tubular shank which is internally threaded around a cylindrical bore for receiving a mating screw threaded bolt, and the shank is then deformed by driving a suitable contoured punch into the external surface of the shank so as to impress the shank and form a depression of corresponding contour in the external surface of the shank, and thus to form a protuberance of generally corresponding shape on the internal threaded surface of the shank so that the protuberance protrudes into the bore sufficiently to be able to interfere with the movement of the bolt along the bore in threaded engagement with the nut.

It will be appreciated that, in order that the punch may make an impression on the shank, the nut must offer a sufficient reaction to the force of the punch, and the nut must therefore be supported, but not in the region of the internal surface of the shank in which the protuberance is to be formed. In the method of the invention the nut is supported in a region of its external surface which is diametrically opposite the zone of the shank on which the punch is to impinge for forming the depression. However, in order to localise the distortion of the shank to a minor sector of its circumference within which it is desired to form the protuberance, and thus avoid distortion of the whole of the remaining major sector of the circumference, the external surface of the nut is supported over a large area disposed symmetrically about the zone diametrically opposite that on which the punch is to impinge.

Figure 9:
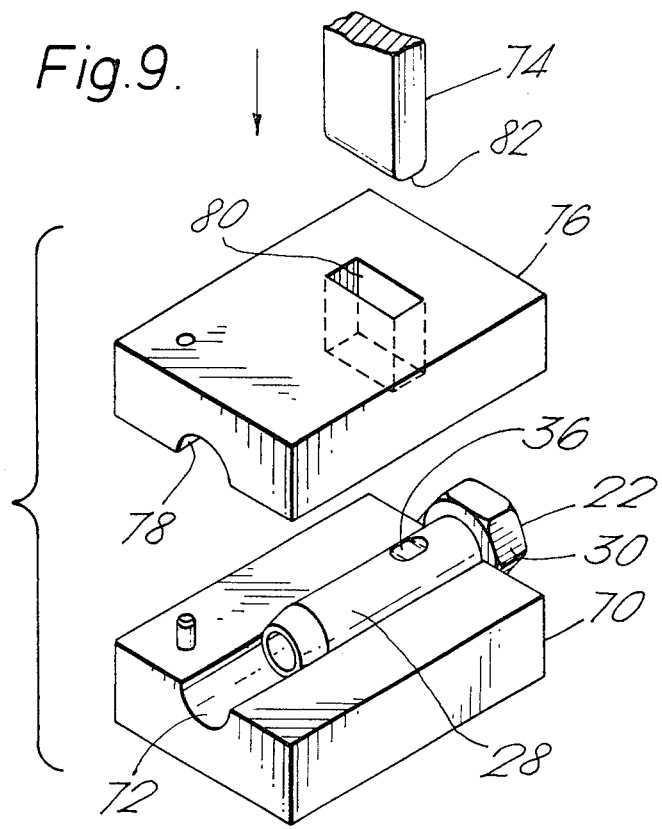
FIG. 9 is an exploded perspective view illustrating apparatus which may be used in the manufacture of blind fasteners according to the invention.

Such support is afforded by a nest having a base 70, shown in FIG. 9, and having a channel 72 of sufficient length to receive the whole length of the shank of the nut. The channel is of semi-circular shape in cross-section and is dimensioned so as to receive the shank of the undeformed nut in closely fitting relationship around one half of the circumference of the shank, and therefore can support that half of the circumference of the shank while an impression is made in the surface of the diametrically opposite half of the circumference by means of a punch 74. The punch 74 is mounted to be driven by a press so as to impinge on the upper surface of the shank of a nut located in the channel and supported from beneath by the nest base 70. The nest therefore not only provides a reaction to the force of the punch, but by reason of its closely-fitting shape, prevents the part of the shank contained within the channel from being deformed outwardly of its original envelope. Consequently, the interior surface of the half of the shank within the channel retains its original half cylinder-shape after the action of the punch on the other half of the shank.

As will be appreciated, in the absence of any other constraint there would be some tendency for strain set up by the action of the punch to cause the shank to bend along its axis and cause the opposite ends of the shank to rise up, out of the channel. In order to prevent this, the channel 72 is angled downwardly towards its ends, and a cooperating nest cap 76 having a similarly angled semi-circular channel 78, is used with the nest base 70 to confine the shank of the nut. The next base 70 and nest cap 76 are divided along a plane extending parallel to the cavity axis and perpendicular to the direction of punch movement.

The cap and nest base fit together to define a close-fitting angled cavity 79 in which the shank of the nut can be confined and, on being forced together with the shank of a nut located in the channels, will bias the shank to bend on its axis and thus counteract such bending as may be imparted by the action of the punch.

The cap 76 has an aperture 80 extending through the cap into the channel 78 to allow the punch 74 to impinge on the shank of a nut confined in the cavity 79. Thus, when the nut is released from the confines of the capped nest after the impression has been made by the punch acting through the aperture 80, the shank of the nut lies on a neutral, straight axis.

The punch shown in FIG. 9 is that used in making the flat depressed zone 36 in the embodiment of FIG. 1, and has a flat working face 82 which is relieved at its edges to avoid overstressing the material of the shank in the regions engaged by the edges of the working face 82. When the punch 74 is driven through the aperture 80 into contact with the shank of an undeformed nut, the flat working face 82 makes a generally flat depression in the external surface of the shank, leading to the formation of a protuberance of generally corresponding shape on the internal surface of the shank. It will therefore be appreciated that protuberances of other shape can be formed by the use of punches having differently shaped working faces, as evidenced by the following further embodiments.

Thus, in FIGS. 4 and 5 is shown a nut 84 of an embodiment of the fastener of the invention in which, by use of a suitably concave curved punch, a convexly arcuate depression 86 has been formed in the external surface of the shank 88. The depression 86 extends in a circumferential sense, around the shank, through an arc a which is restricted to a minor sector of the circumference, and has a radius of curvature about the axis of the shank greater than that of the external surface of the shank of the nut. In the longitudinal direction of the shank, the depression is parallel to the axis of the shank. As will be appreciated, a protuberance 90 of generally corresponding shape has been formed in a zone of the internal surface of the shank which corresponds to the external depression. The protuberance 90 is arcuate in the same sense as the internal surface of the shank, and protrudes into the bore, of which the original shape before formation of the protuberance is indicated by a broken line, and extends across a minor sector of the bore, as shown.

The nut 84 is otherwise similar to the nut 22 of FIG. 1.

Figure 6:
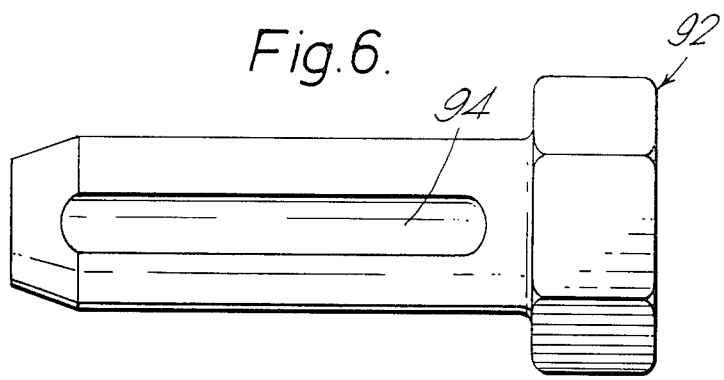
FIG. 6 is a plan view of part of another embodiment.

FIG. 6 shows a nut 92 of a similar embodiment in which an elongate flat depression 94 in the external surface of the shank of the extends substantially the whole length of the shank but is spaced slightly from the head to avoid strains in the material of the shank adjacent to the head. The nut 92 has a protuberance (not shown) which protrudes into the bore of the nut 92 and which is of generally corresponding shape to the elongate depression 94. The protuberance of the nut 92 is able to exert a frictional locking force on a bolt throughout a long length of the bolt and over many turns of thread.

Figure 7:
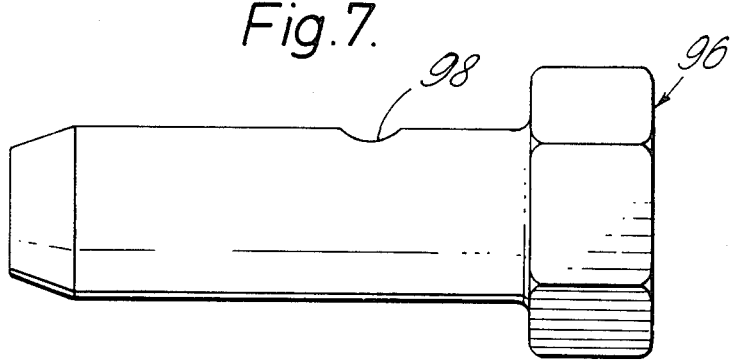
FIGS. 7 and 8 are side elevations of parts of two further embodiments.

FIG. 7 shows a nut 96 of another embodiment in which a depression 98 is concavely curved in the longitudinal direction of the nut, but is straight in a direction tangential to the shank of the nut 96. The nut 96 has a protuberance (not shown) corresponding generally in shape to that of the depression 98.

Figure 8:
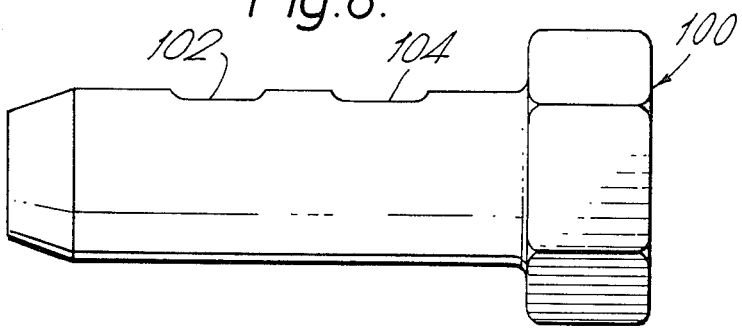

FIG. 8 shows a nut 100 of yet another embodiment in which the shank of the nut has two spaced protuberances provided by the formation of two depressions 102, 104 which are located in longitudinally spaced apart sections of the shank. The depressions and protuberances are shaped like the depression 36 and protuberance 42 of the embodiment of FIG. 1, and are located in the same minor sector of the circumference of the shank. It has been found that, when two or more depressions and corresponding protuberances are sufficiently spaced apart lengthwise of an elongate shank, they may be located in different or even opposite sectors of the circumference of the shank.

FIG. 4a is similar to FIG. 4 but shows an embodiment in which the nut 84' has an additional depression 87 which is spaced from the depression 86 in both the axial and circumferential directions.

Figure 10:
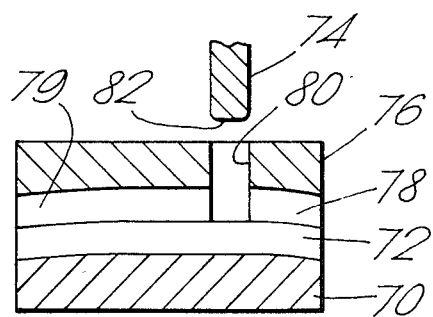
FIG. 10 ia a longitudinal sectional view of the apparatus of FIG. 9.
Figure 11:
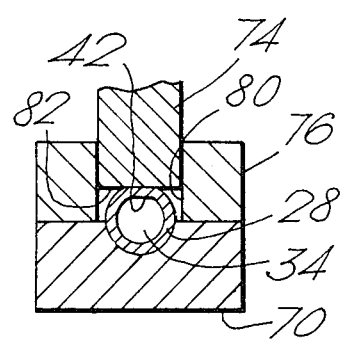
FIG. 11 is a cross-sectional view showing the apparatus of FIG. 9 in use.

It will be appreciated that a modification of the apparatus of FIGS. 9 to 11 would be necessary to allow two punches to impinge simultaneously on a nut at spaced apart locations. Thus, two apertures such as the aperture 80 would have to be provided. They could both be provided in the cap or one could be in the cap 76 and another in the nest base 70.

By confining the or each depression and protuberance to a minor sector of the circumference of the shank, the length of the resilient arcuate portions in the undeformed major sector, such as the portions 60, 62, is kept as long as reasonably practicable so that, if regarded as springs, they have a slower-rate than would be the case if the depression and protuberance extended through a greater sector and the arcuate portions were shorter. To some extent, this is affected by both shape of the punch and the depth to which the punch depresses the external surface of the shank.

It will therefore be understood that the strength of the lock developed between a nut and bolt can be controlled by varying the force or travel of the punch, and hence the depth of the depression and the extent to which the protuberance protrudes into the bore, and also by varying the shape and area of the working face of the punch. We believe it is within the capability of a skilled workman to make adjustments to meet particular requirements.

I claim:

1. A self-locking blind fastener comprising a nut having:
    an enlarged head;
    a tubular shank attached to said head;
    internal threading in said tubular shank; and
    an axial section of said shank having a single arcuate inwardly depressed zone extending over only a single minor circumferential sector of said axial section of said shank, said depressed zone defining a protruberant zone of said internal threading for resisting movement of a bolt threaded in said shank, wherein a radius of curvature of said depressed zone about the axis of said shank is greater than that of the external surface of said shank, and wherein there are at least two of said arcuate zones spaced along the length of said shank.

2. The blind fastener of claim 1 wherein the curvature of said arcuate depressed zone has the same sense as said shank.

3. The blind fastener of claim 1 wherein all of said arcuate zones are in the same circumferential sector of said shank.

4. The blind fastener of claim 1 wherein at least one of said arcuate zones is in a circumferential sector of said shank different from a circumferential sector of at least one other one of said arcuate zones.

5. The blind fastener of claim 1 wherein said axial section of said shank is substantially cylindrical.

* * * * *